United States Patent [19]
Green

[11] Patent Number: 5,288,233
[45] Date of Patent: Feb. 22, 1994

[54] LEARNING DEVICE FOR ATTENTION DEFICIT CHILDREN

[76] Inventor: Janet E. Green, 504 Oakhurst St., Brandon, Fla. 33511

[21] Appl. No.: 46,132

[22] Filed: Apr. 15, 1993

[51] Int. Cl.$^5$ .............................................. G09B 19/00
[52] U.S. Cl. .................................................. 434/238
[58] Field of Search ................................ 434/238, 236

[56] References Cited

U.S. PATENT DOCUMENTS

| | | | |
|---|---|---|---|
| 2,840,213 | 6/1958 | Gilmour | 434/238 X |
| 4,384,855 | 5/1983 | Walsh | 434/238 |
| 4,776,799 | 10/1988 | Walsh | 434/238 |
| 4,863,386 | 9/1989 | Maxey | 434/238 X |

Primary Examiner—Gene Mancene
Assistant Examiner—Jeffrey A. Smith

[57] ABSTRACT

A learning device for attention deficit children is disclosed, having a wall mounted cabinet with an audio equipped model train located in a mirrored frontal surface, and sufficient timing devices to guide the child through a series of planned tasks, and having storage capability for associated task cards, listing pre-planned tasks, to be completed by the child, and storage space for negative correction cards, to be given to child upon non-completion of tasks. A slot is located on the side of the cabinet, and, when child successfully completes a task, in the time allowed, insertion of the corresponding card in the slot ejects a chip to the child, to be accumulated by the child, and, at certain periods of time, marked on a furnished calendar, the child is rewarded from a list of chosen rewards, each reward requiring a different number of chips, the rewards being weighted by importance to child.

4 Claims, 7 Drawing Sheets

CHIP TALLY SHEET

MY NAME IS _____ TODAY'S DATE_____

I COMPLETED _____ TASKS.

MY GOAL WAS _____ TASKS.

I RECEIVED _____ CHIPS.

NUMBER TO DO OVER: _____

SUCCESSFULLY DONE: _____

MY SIGNATURE _____

ADULT FRIEND'S SIGNATURE _____

NOW I HAVE A TOTAL OF _____ CHIPS!

FIG 7

LEARNING DEVICE FOR ATTENTION DEFICIT CHILDREN

BACKGROUND OF INVENTION

This invention relates to an apparatus and method of teaching attention deficit children how to complete tasks within a reasonable time period, and in a manner to emphasize positive rewards, as opposed to negative punishments. The invention consists of a device in the form of a working game, the object of the game being to encourage, and help the child pay attention to the task they are instructed to perform, and to continue doing this task until it is completed.

Attention deficit hyperactivity disorder (ADHD) is a disability that is well known to professional psychologists. It is estimated to affect approximately five per cent of school-age children, and is diagnosed by the presence of various behavioral symptoms. The children suffering from this disorder appear restless, or, "fidgety", frequently having difficulty sitting still in school, are very easily distracted, often fail to follow instructions, or complete tasks, lose items required to complete tasks they have been given, and commonly switch from one uncompleted task to another without finishing any of them.

Physicians, and psychologists treat attention deficit children through a variety of methods, including medication, dietary restrictions, psychotherapy, cognitive training, and behavior modification. While no one method of treatment is likely to completely cure attention deficit children, a combination of those mentioned procedures can be quite effective in helping children overcome it. Medicines, and psychological counseling must be administered under the supervision of qualified professionals. However, parents, teachers, and other caretakers can contribute to some of the other treatment methods. Puzzles, and mazes, are commonly used in cognitive training. These devices help attention deficit children to develop problem solving skills, and to channel their interests and energies toward clearly definable goals. Behavior modification is accomplished by programs that generously reinforce positive behaviors, while also making it clear that improper behavior will result in negative consequences. Often, children are encouraged to earn "points", which can later be exchanged for rewards. These mentioned treatment methods have been found useful in dealing with attention deficit behavior, however, the usual mechanism for effecting behavior modification has depended on the parent or, teacher's ability to react properly to the child's actions. Personal reinforcement and praise are essential, of course, but, it has been discovered by the inventor that there are times when a mechanical device is useful in maintaining the positive reinforcement, especially when parents or, teachers, are unable to immediately reward proper behavior.

In researching the field for this invention, no prior arts were found of a similar teaching. Two prior arts found, did appear in the search for games for educational and amusement purposes, however neither of these teachings would be suitable for providing the direct cognitive and direct behavioral training needed by attention deficit children.

Perry, in U.S. Pat. No. 4,878,675 teaches a game having a dual-purpose board, and several decks of cards used in playing a game. One option uses standard playing cards, and bingo type score cards, along with the main board. This part of the game is intended for pure entertainment. The other option uses another track around the board, together with suitably designed reward and punishment cards. The purpose of this option is to teach players about the dangers of alcohol, and substance abuse, while simulating a car trip across the United States. However, this game does not specifically address the problems of attention deficit children, and this type of reward system would not work with these children, since there is no connection between playing of the game, and the specific activities in which the player is currently engaged.

Playing this game in one of its two embodiments can lead to increased awareness of the hazards of drug use, but it does not lead the child through their required tasks, nor provide any immediate consequences as a result of the childish behavior. In addition, considering that the game deals with abuse of substances more closely associated with teenagers and adults, and that it requires some knowledge of geography and driving, it would not be interesting to younger children.

Giesaker, in U. S. Pat. No. 4,974,848 teaches a maze device that can be implemented as a hand held puzzle, a video game, or an arcade game. With suitable modifications, it could also be used as a locking device for safes, or other secured containers. The problems with this device are that it lacks visual, and audio, attractiveness, and poses a problem beyond the capabilities of young children. Attention deficit children, in particular, would tend to lose interest in the device very quickly, and move on to other activities. This is exactly the opposite of the behavior that should be engendered by a teaching device for use with these children.

SUMMARY OF THE INVENTION

Accordingly, it is an object of this invention to provide an apparatus and method for encouraging positive behaviors on the part of these attention deficit children, while at the same time being physically appealing, and interesting to the child.

Another object of this invention is to provide immediate audio, and physical, game type reinforcement and gratification to children who successfully complete the task assigned to them.

Another object of this invention is to provide an apparatus for reinforcing positive behaviors over a period of days, weeks, and months, by providing a cumulative reward system.

Still another object of this invention is to provide consistent and constructive negative consequences for behaviors that do not meet the requirements of the task assigned.

Yet another object of this invention is to provide a device that the child can use more or less independently of adult supervision, and which will positively reinforce proper behavior, even when the adult caregiver is not immediately available.

Yet another object of this invention is to teach the child using the invention to responsibly plan for the rewards they earn, by consulting with the adult partner involved, then marking the planned event on a calendar, provided for this purpose.

Still another object of this invention is to provide a device that is safe for use by a child, in which there are few moving parts, and no sources of high voltage, or other hazardous conditions.

In carrying out this invention in the illustrative embodiment thereof, a learning device is provided, being constructed as a wall mounted cabinet, having a miniature train engine, and at least one railroad car, affixed onto the upward frontal portion of the cabinet. This cabinet is mounted on a wall or other surface at a height that is convenient for use by the child. The cabinet is designed to be visually attractive to a child, and could include any especially attractive, and/or animated character associated with the train, and having brightly colored surfaces, colored lights, mirrored surfaces, and, for this embodiment, explained herein, a decorative train engine, and railroad car, equipped with railroad type audio, mounted on the front surface of the cabinet.

On one side of the cabinet, there is a container that holds a supply of "on track", cards describing tasks to be completed. These cards are designed in a decorative manner, and provide both a task to be completed, and a time limit in which it should be completed, this time limit being derived by both the child, and the caretaker.

These cards are also color coded, for morning, afternoon, and evening tasks.

On the other side of the cabinet is a container which holds a supply of "off track" cards. These off track cards state in first person a consequence to be carried out when an on track task was not completed appropriately within the given time frame. It also dictates the next step after the consequence has been met. The flip side of each card features a step-by-step analysis of the consequence in writing. Also, several blank cards are included, which the caregiver, and the child can write additional tasks, and times of completion.

Also, on the front of the cabinet is a digital task completion timer, and a starter clock, the starter clock having two sets of hands, one set of hands displaying the correct time of day, and the other set of hands displaying the starting time for all of the tasks for that particular session of tasks for the child.

On this same side of the cabinet is a slot for inserting a completed task card, causing an actuator to force a chip, from a supply of chips, stored inside the cabinet, to fall into a receiving holder at the bottom of the cabinet, and, this falling chip being visible to the child, and this chip actuator only being operable when a task has been successfully completed within the allotted time frame.

In operation, the child takes one, or more, of the appropriate color coded cards for this session, or is given them by the adult partner, and appropriately moves the settable hands of the starter clock ahead to the required time of completion. The child then, using these task cards for this session, backs these settable hands the increment of time allowed for each of the tasks to be completed during this session. As an example, after setting the settable hands of the starter clock to the required completion time for all of the tasks of this session, and the child has three tasks to complete, one task being to brush their teeth, and this task allowing 7 minutes, the settable hands would be moved backward 7 minutes from the required completion time for all of the tasks for this session. The next task card being to make up the bed, allowing 5 minutes, requiring that the settable hands of the same starter clock to be moved backward 5 more minutes. The next task being to get dressed, allowing 15 minutes on the task card, the settable hands would be moved backward another 15 minutes, and this would be the starting time for all of the tasks for this session.

Now, when this starting time is reached, and the time indicating hands of the starter clock, and the settable hands of the same starter clock match time, a train whistle blows, notifying the child that it is time to brush their teeth. At this time, the child sets the digital task clock to 7 minutes, this being the allowed time to brush their teeth, and the child is off on this task. Now, in order to maintain an attention atmosphere for the child, circuitry exists in the clocks to provide auditory signals for the child to follow: 1. when it is time to start the tasks: 2. every 60 seconds to remind the child that the digital timer is set for that task: 3. when the task is completed successfully, and the on-track card is inserted into the completion slot: and 4. when the chip falls down into the receptacle.

In simple operation, the child takes all of the cards from the retainer of the color to match the morning tasks. There are three tasks to complete, teeth brushing, make up the bed, and get dressed. The settable hands of the clock are set forward to the required completion time for all of the tasks, and then backed off the increment of time for each of the tasks for that session, to establish the starting time for these tasks. When the starting time is reached, and the train whistle blows, the first task being to brush their teeth, the digital clock is set to 07 minutes, and the task is begun. An audible train sound is activated every 60 seconds to keep the childs attention, and, if the teeth are brushed to satisfaction, the "brush teeth" card is inserted into the appropriate slot on the side of the cabinet, and, as the digital clock has not counted down to zero, the insertion of the card in the slot triggers the appropriate circuit in the cabinet, and a chip is forced from a supply of chips, and the child sees this chip fall downward into a small receptacle at the bottom of the cabinet, and the child has a chip at their disposal. If, however, the digital clock had counted down to zero, triggering an appropriate audible sound, before the teeth had been brushed, no chip is dispensed and, the child must take an "off-track" card from the supply of these cards located in a container on the side of the cabinet, and this "off-track" card explains to the child the consequences to be followed, usually, a second chance, and encouragement to do better on the next try. However, a series of missed tries triggers more thorough instructions, as, "go to your quiet spot and think for awhile." Upon gaining a re-try, the child must reset the task completion time on the starter clock, and start over from the time of the missed task.

Sufficient materials are furnished to complete this attention deficit learning device. Along with the cards, there is a calendar, a reward list sheet, and a pad of tear off sheets, each entitled "Chip Tally Sheet", and the user will fill out their name, date, chip goal, tasks completed, and chips received. Once the required tasks are completed, the chips are subtotaled, and the sheet is given to the caretaker.

At this time, or, between each task, the caregiver inspects the completed task. Any task that was not appropriately completed causes that chip received to be subtracted from the subtotal, and put back into the trains storage container until it is earned appropriately. Once this has taken place, the chips are re-totaled, the user signs their name, and the caregiver signs, indicating each task was completed. A weekly total is kept at the bottom, for tracking outcomes. Once the caregiver has signed the chip tally sheet, the user may review the "reward myself" sheet, and either exchange the chips for a reward, or save them for later exchange. Once the reward has been received, the user turn in the used chips, and the caregiver returns those chips to the chip storage container inside the cabinet.

The operation of the device, as described above, is intended to give the child immediate rewards for desirable behavior. It also provides a method of reinforcing long term good behavior, in that the child is allowed to collect the chips over a period of time, as a week or month. At the end of the designated period of time for collection of the chips, the child then can select one, or more, rewards from the previously prepared list of rewards. The importance of the reward is proportional to the number of chips collected in the allotted time.

Now, if the child fails to complete their task in the time allowed, or, if they lose the card, the digital timer will continue to count down, until it reaches zero, and rings, signaling a failure to complete the task. At that point, the adult partner gives the child another card that instructs them to go to a pre-arranged "quiet place", until they feel ready to finish the task. When they indicate readiness to try again, the parent or teacher may give them an "encouragement card", reset the timer, and send them back to complete the task. If they subsequently finish the required activity, they are allowed to operate the device, and receive the rewards.

The learning device also incorporates a method of teaching the child responsibility, and pre-planning skills. This is accomplished by requiring them to discuss some of the rewards they wish to receive with the adult, who will be involved. For example, if the reward is to have "Daddy play the guitar", the child must arrange a time at which the father can accommodate this request. The child then marks down the agreed time on a calendar that is provided for this purpose, after the required number of chips has been earned.

The electrical design of the device makes use of low power, DC components, and is powered by a DC battery, or other DC source, making the device safe for children.

Interlocking circuitry in the device also provides opening of the cabinet by the child, the interlock device disconnecting all electrical current.

Conveniently, using this device allows the attention deficit child to be encouraged to learn task completion and planning skills, while also enjoying a pleasing game that provides both immediate and long term rewards for desirable behavior.

BRIEF DESCRIPTION OF THE DRAWINGS

This invention, together with other objects, features, aspects and advantages thereof, will be more clearly understood from the following description, considered in conjunction with the accompanying drawings.

FIG. 7 is a typical chip tally sheet.

DESCRIPTION OF THE PREFERRED EMBODIMENTS

Figure 1:
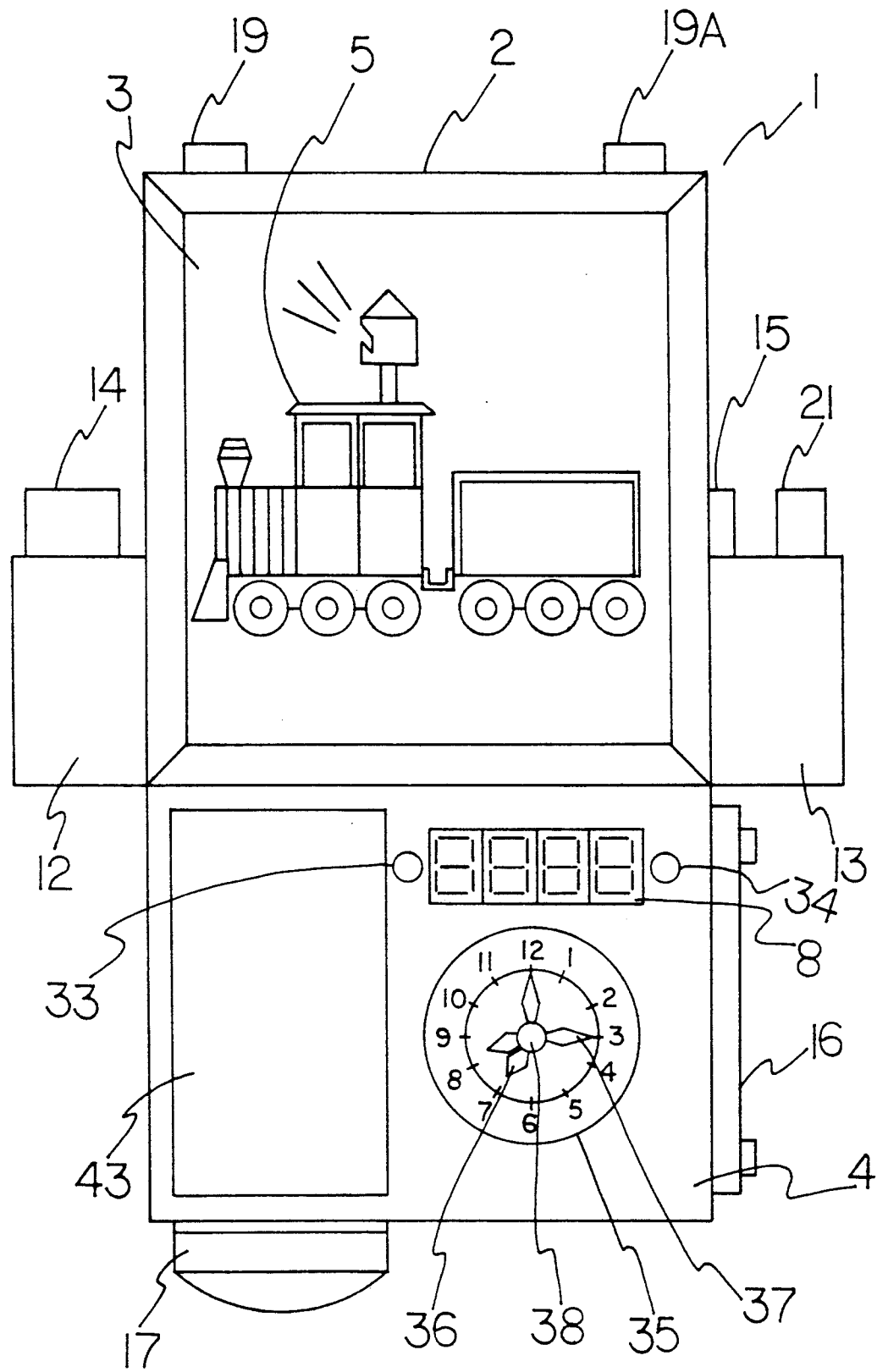
FIG. 1 is a front elevation of the learning device, in its preferred embodiment.

Referring now to FIG. 1, a learning device for hyperactive children, referred to generally by the reference numeral 1, is made of a suitable material, and is constructed in the form of a wall mountable cabinet 2, which is to be mounted on a wall, or other suitable surface, within easy reach of the child.

Cabinet 2 having mirrored upper front panel 3, and lower control front panel 4, control panel 4 being removeably mounted on cabinet 2, and upper panel 3 being hingedly affixed to cabinet 2, allowing easy access to the interior components of cabinet 2.

Figure 6:
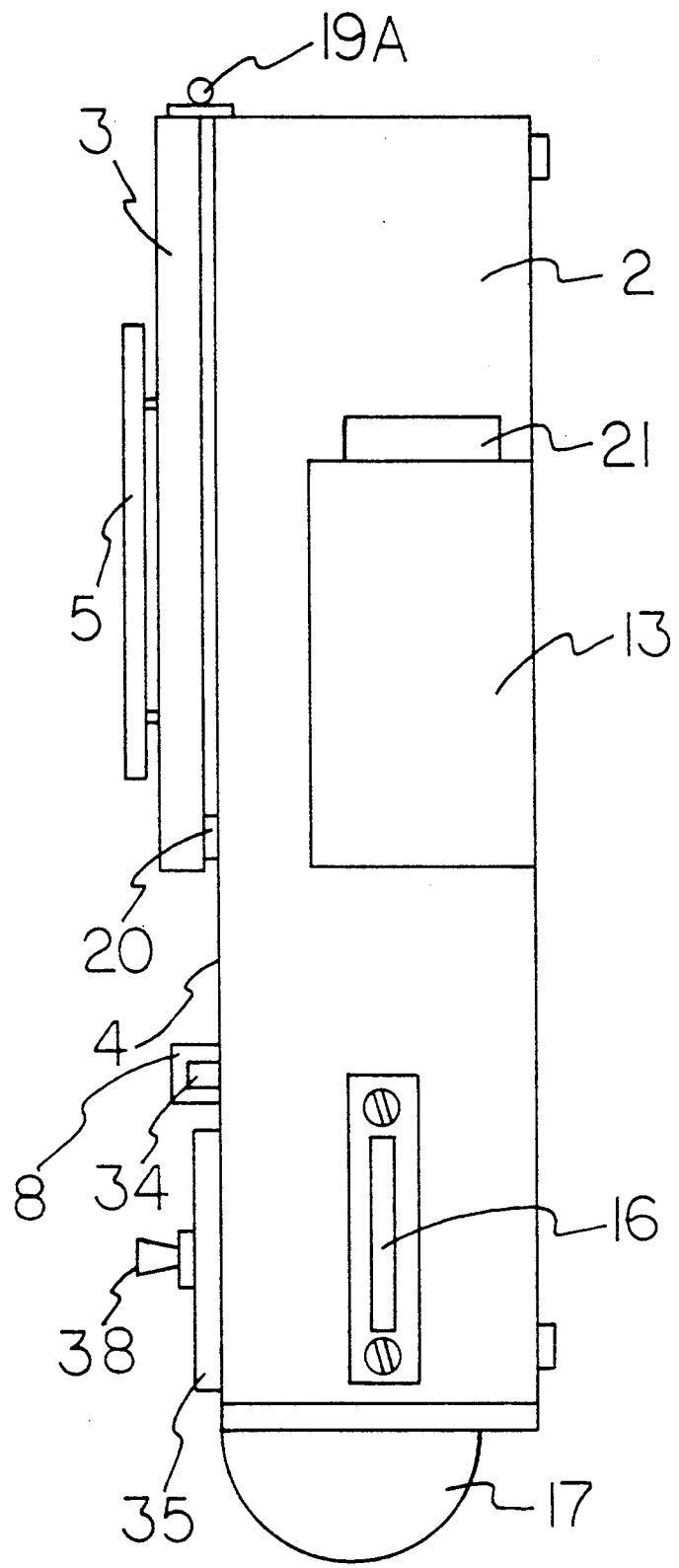
FIG. 6 is a view of the device from the right side, showing the actuating slot, and completed card collecting bin.

Upper front panel 3 is attached to the front of cabinet 2 by spring loaded, two position hinges 19, and 19A, and being held closed by magnetic interlock 20, shown in FIG. 6. Upper panel 3 also having ornamental train 5 affixed onto its outer surface. Lower control panel 4 having digital timer 8, and setting switches 33, and 34, mounted on its outer surface, and having audible signals electrically operated by contained circuitry. Also mounted on the frontal surface of lower control panel 4 is a starter clock 35, and this starter clock has two sets of hands, 36, and 37, and setting knob 38, the one set of hands 37 displaying the present time, and the other set of hands 36 being settasable by setting knob 38.

Figure 2:
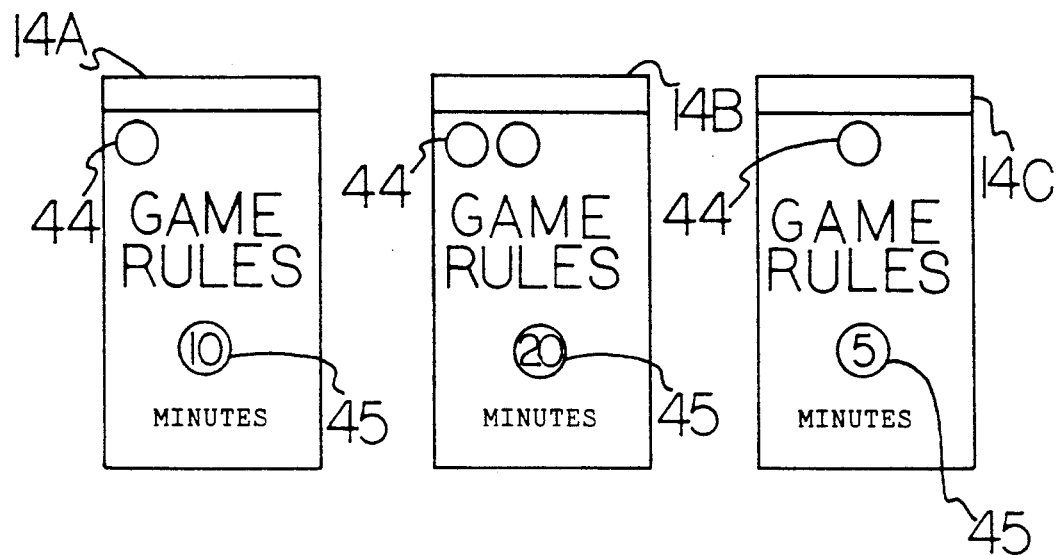
FIG. 2 illustrates typical task, or duty cards, printed on both the face and the rear of the card, that are used to specify the task the child is expected to perform.
Figure 2:
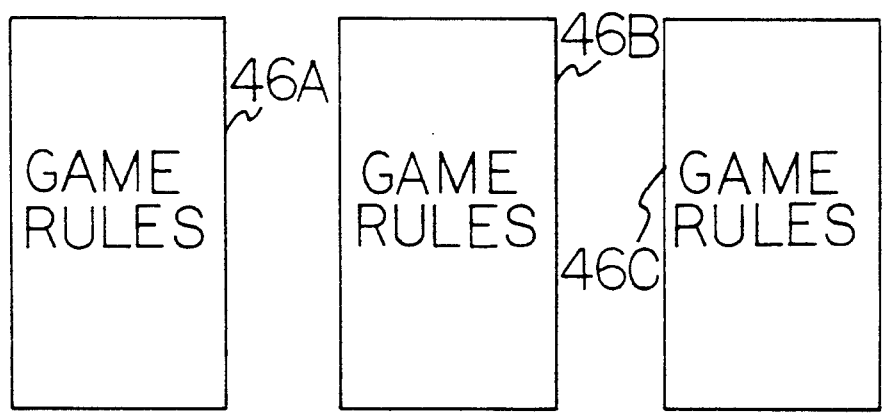

Now, and still referring to FIG. 1, two rectangular bins 12, and 13 are mounted on opposite sides of cabinet 2. On track card holding bin 12 containing uncompleted task cards 14. Referring now to FIG. 2, task cards 14A, 14B, and 14C, made of a rigid material, being color coded by stick on labels 44 for morining, afternoon and evening designations, and specifying a task to be completed, together with a time limit 45 in which it is to be completed, and reverse sides 46A, 46B, and 46C, of cards 14A, 14B, and 14C, further describing these tasks.

Referring again to FIG. 1, collection bin 13 holds completed task cards 21, and administrative cards 15.

Figure 4:
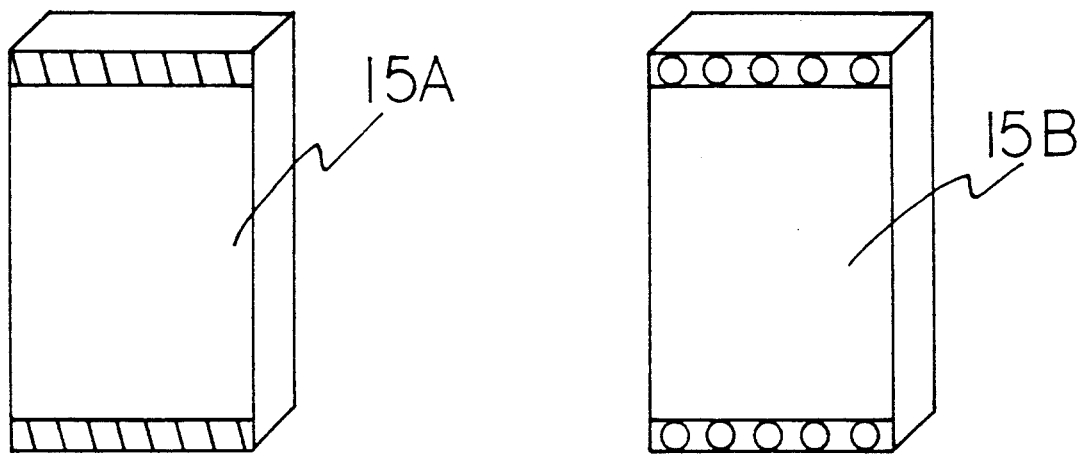
FIG. 4 shows the cards used for inflicting consequences if the child fails to perform as required, and for offering encouragement, when they try again.

Now, and referring now to FIG. 4, we see that administrative cards 15 comprising two separate cards 15A, and 15B. Negative consequence card 15A is given to the child when they fail to complete the assigned task within the time allowed. Encouragement card 15B is given to the child when they express willingness to try the failed task again.

Progressing now to FIG. 6, we see below collection bin 13 actuating slot 16. When the child successfully completes their task, they are allowed to insert duty card 14 into slot 16, actuating card switch 22, shown more clearly in FIG. 5, causing chip ejector solenoid 23 to be actuated, causing chip 18 to be ejected from chip ejector mechanism 17.

Figure 5:
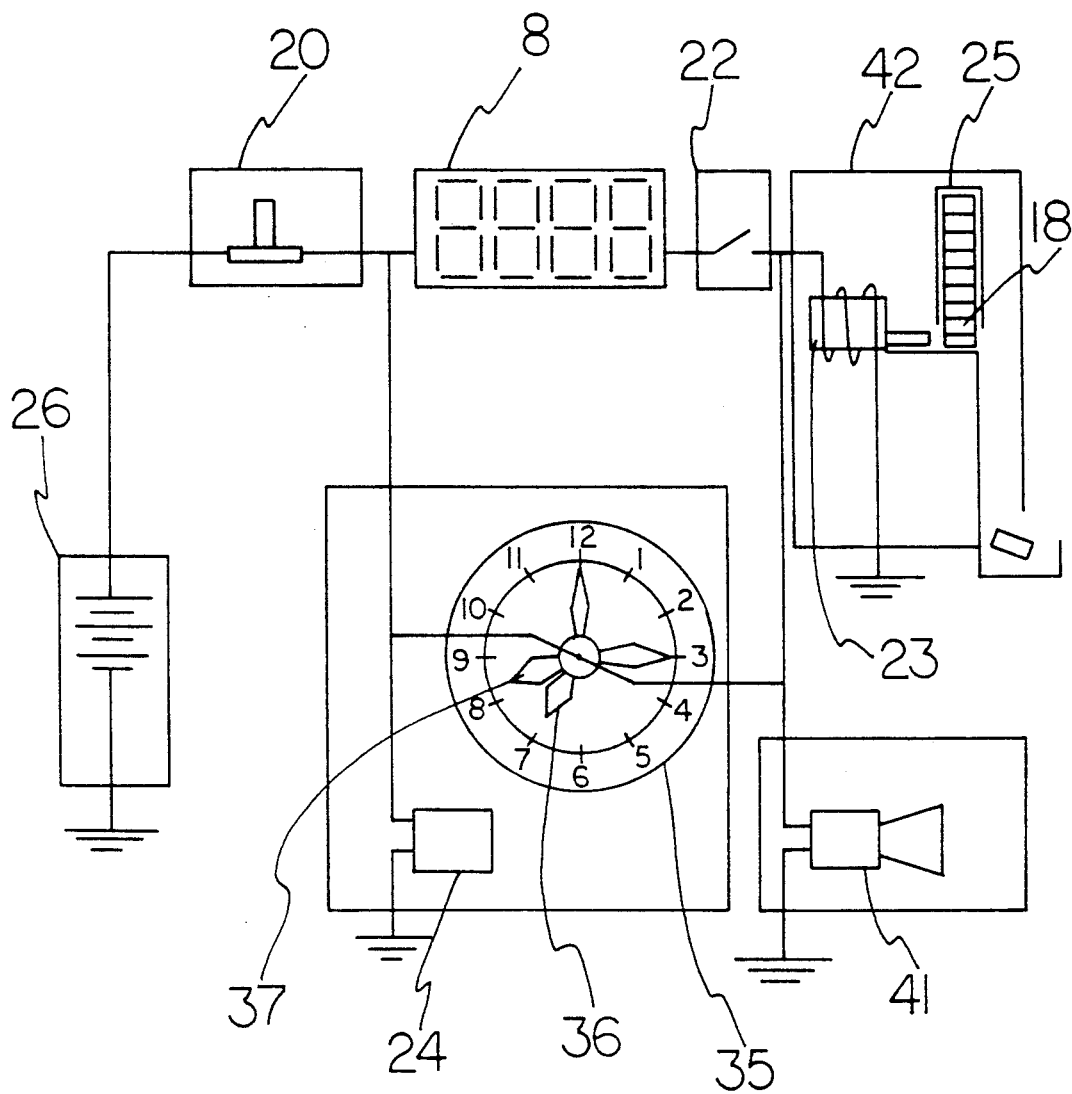
FIG. 5 is a block schematic diagram showing the circuitry of the device.

Now, and referring again to FIG. 1, chip ejector mechanism 17 is located in the bottom of cabinet 2, and poker style chips 18 are gravity fed to the bottom of chip hopper 25, shown more clearly in FIG. 5, in order that they can be singly ejected from chip ejector mechanism 17, by chip ejector solenoid 23, and falling chips viewed in area 43. Chips 18 are supplied to hopper 25 by the adult partner, when necessary, access to hopper 25 being gained by opening mirrored upper panel 3, mirrored panel 3 being retained in its open position by spring loaded position hinges, 19, and 19A.

Figure 3:
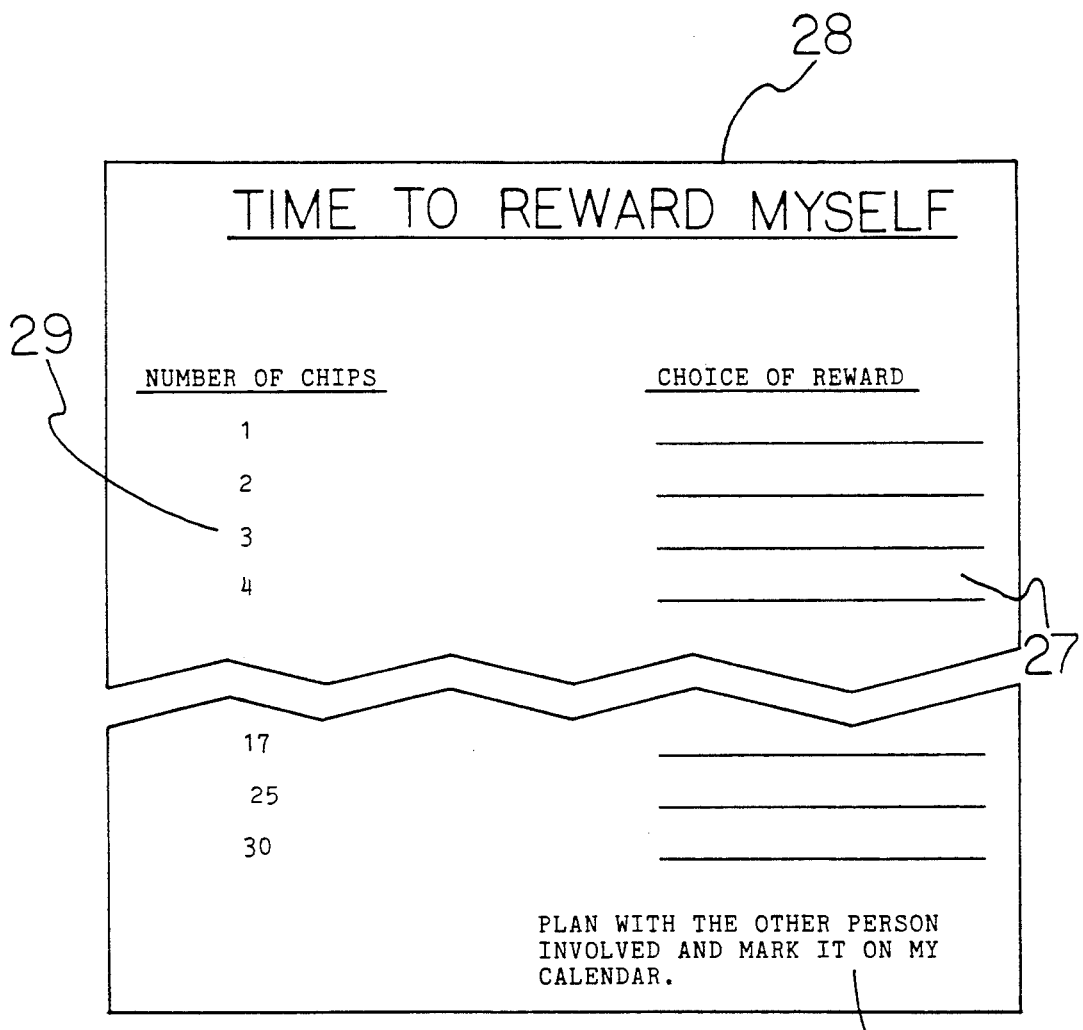
FIG. 3 is a representation of the list of rewards the child can earn, based on the number of chips they collect.

Now, referring to FIG. 5, we see that power for the operation of learning device 1 is obtained from dry cell battery 26. Battery 26 supplying power through magnetic interlock switch 20, making power available to card switch 22, which, when actuated by a duty card 14, supplys power to chip ejector mechanism 42, and solenoid 23, and DC motor 24, and train whistle 41. Chips 18 obtained from chip ejector mechanism 17 are stored in collection bin 13, with competed task cards 21. Referring now to FIG. 3, at the end of a specified time period, the child removes and counts them, completes chip tally sheet 47, seen in FIG. 7, then selects a reward 27 from reward list 28, based on the quantity of chips 18 collected and stored 29. A note 30, located on reward list 28, reminds the child to consult with the adult partner, before marking the reward on their calendar.

Accordingly, a very unique, attractive, convenient method, and apparatus are provided for teaching hyperactive children how to complete tasks within a reasonable time, and to learn responsibility, and scheduling skills. Mechanisms are provided for both immediate gratification and long term reward, as well as are negative consequences for unacceptable behavior.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention, as claimed in the following claims and reasonable equivalents to the claimed elements.

What is claimed is:

1. A learning device for attention deficit children, comprising a wall mounted, substantially rectangular enclosure, said enclosure having at least two separate compartments consisting of an upper hinged section, and a lower closed section;

said enclosure also having attached side mounted storing means for a plurality of "on-track" cards each having a task to be completed by an attention deficit child, said storing means being an extension of one side of said enclosure, said enclosure also having attached side mounted storing means for storing a plurality of "off-track" cards each having information which reinforces positive action from said attention deficit child, said upper section of said enclosure having a mirrored frontal surface, and said mirrored frontal section supporting a model train, said lower section of said enclosure having a timer apparatus, said timer apparatus being a starter clock, and said starter clock having two sets of hands, the one set of hands displaying the present time of day, and the other set of hands being settable, as desired, said lower section of said enclosure also having a settable digital clock, and said settable digital clock having audible sounding means to alert said child when said digital clock has counted down to zero, said lower section of said enclosure also having a plurality of chips being stored in a refillable stacking enclosure, said stacking enclosure being affixed inside said lower section of said enclosure, said enclosure further comprising a receiving slot located on one side of side of said enclosure, said receiving slot allowing insertion of an "on-track" card into said slot, said lower section of said enclosure also having a dispensing means comprising an electrical switch, a solenoid and audio circuitry, said dispensing means allowing for solenoidal activation of a push mechanism such that when said "on-track" card is inserted edgewise into said receiving slot said "on-track" card activates said electrical switch which in turn activates said solenoid and said audio electrical circuitry, said lower section of said enclosure also having a translucent viewing area in a frontal surface thereof, said translucent viewing area providing means for said child to view the operation of one of said plurality of chips being dispensed, and said lower section of said enclosure having storing means for a plurality of dispensed chips, said dispensed chips earned by said attention deficit child over a period of time.

2. A learning device for attention deficit children of claim 1 having electrical circuitry for operating the electrical components of said device, power to said circuitry being direct current.

3. A learning device for attention deficit children of claim 2 having separate calendar means for marking planning reward information by said attention deficit child.

4. A learning device for attention deficit children of claim 3 having a separate reward list, said rewards being chosen by said attention deficit child, and, said rewards being weighted as to importance to said attention deficit child, and, the required number of said chips required to qualify for said weighted rewards.

* * * * *